(12) United States Patent
Volponi

(10) Patent No.: US 7,136,809 B2
(45) Date of Patent: Nov. 14, 2006

(54) METHOD FOR PERFORMING AN EMPIRICAL TEST FOR THE PRESENCE OF BI-MODAL DATA

(75) Inventor: Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 530 days.

(21) Appl. No.: 10/285,961

(22) Filed: Oct. 31, 2002

(65) Prior Publication Data

US 2004/0088159 A1      May 6, 2004

(51) Int. Cl.
*G10L 21/00* (2006.01)
(52) U.S. Cl. ........................................ 704/201; 704/202
(58) Field of Classification Search ............... 704/200, 704/202; 703/2
See application file for complete search history.

(56) References Cited

U.S. PATENT DOCUMENTS 6,167,156 A * 12/2000 Antoniades et al. ........ 382/232
6,246,972 B1 * 6/2001 Klimasauskas ................ 703/2

* cited by examiner

*Primary Examiner*—Susan McFadden
(74) *Attorney, Agent, or Firm*—Bachman & LaPointe, P.C.

(57) ABSTRACT

A method for identifying bi-modal data comprises the steps of receiving a plurality of data inputs, constructing a histogram from the plurality of data inputs, computing a range of the plurality of data inputs, comparing the range of the plurality of data inputs to an expected non-repeatability of the plurality of data inputs, calculating a plurality of histogram frequencies if the range is not less than the expected non-repeatability, inputting the plurality of histogram frequencies and a plurality of precomputed weights into a learned vector quantization (LVQ) network, and outputting from the learned vector quantization a bimodal flag indicative of the bimodality of the plurality of data inputs.

4 Claims, 4 Drawing Sheets

METHOD FOR PERFORMING AN EMPIRICAL TEST FOR THE PRESENCE OF BI-MODAL DATA

BACKGROUND OF THE INVENTION (1) Field of the Invention

The present invention relates to a method for performing a test for bimodulating on a data set. More specifically, the present invention relates to a method for using a neural network to empirically discern the modality of a data set.

(2) Description of Related Art

The determination of whether or not a sampled data set exhibits a uni-modal characteristic can be critical to how the data is processed and analyzed. For example, in the area of gas turbine performance diagnostic trending, it is necessary to initialize the process by determining the (initial) performance state of the engine from a sample of engine data. A pivotal requirement to achieve this is to insure that the data sample be homogeneous, i.e., that it does not exhibit a bi-modal feature. In this example, a bi-modal characteristic might arise from a sudden trend shift in the data due to a performance change, degradation, or hardware failure or even a maintenance corrective action. Since the process involves statistical manipulations (averaging, calculating scatter, etc.), it is critical to insure that the sample remains homogeneous. Formal statistical tests for homogeneity are either non-existent or too complex for automatic real-time implementation.

A simple method for determining bi-modality in a given data set is to visually inspect the sample. The construction of a histogram aids greatly in this determination. If the sample histogram 1 is homogeneous, it will yield one mode 3 and appear as illustrated in FIG. 1. Conversely, bi-modal data will produce a histogram as illustrated in FIG. 2.

The distinguishing factor that separates the two histograms 1 of FIGS. 1 and 2 is the presence of 2 peaks (modes) 3 in the histogram 1 of FIG. 2. Human vision is capable naturally of distinguishing whether or not a data set under consideration possesses a twin peak characteristic. What is therefore needed is a method of automatically accomplishing, by use of a computer, that which human vision accomplishes naturally. Specifically, there is needed a simple empirically based methodology for the purpose of identifying bi-modal data.

SUMMARY OF THE INVENTION

Accordingly, it is an object of the present invention to provide a method for using a neural network to empirically discern the modality of a data set.

In accordance with the present invention, a method of performing diagnostics on a system comprises a method for identifying bi-modal data comprises the steps of receiving a plurality of data inputs, constructing a histogram from the plurality of data inputs, computing a range of the plurality of data inputs, comparing the range of the plurality of data inputs to an expected non-repeatability of the plurality of data inputs, calculating a plurality of histogram frequencies if the range is not less than the expected non-repeatability, inputting the plurality of histogram frequencies and a plurality of precomputed weights into a learned vector quantization (LVQ) network, and outputting from the learned vector quantization a bimodal flag indicative of the bimodality of the plurality of data inputs.

In accordance with the present invention, a learned vector quantization network for identifying bimodal data comprises an input receiver for receiving a plurality of histogram frequencies, an input receiver for receiving a plurality of precomputed weights, a competitive learning layer comprised of a plurality of competitive learning layer neurons each receiving the product of at least one of the plurality of precomputed weights and one of the plurality of histogram frequencies, and a linear layer comprised of a plurality of linear layer neurons for receiving a competitive learning layer output and outputting a bimodal flag.

DETAILED DESCRIPTION OF THE PREFERRED EMBODIMENT(S)

Figure 1:
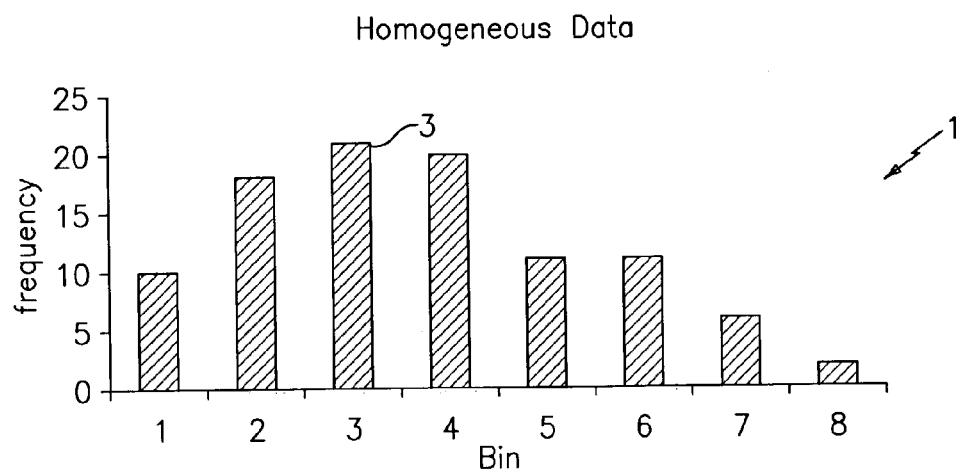
FIG. 1—A histogram of homogeneous data.
Figure 2:
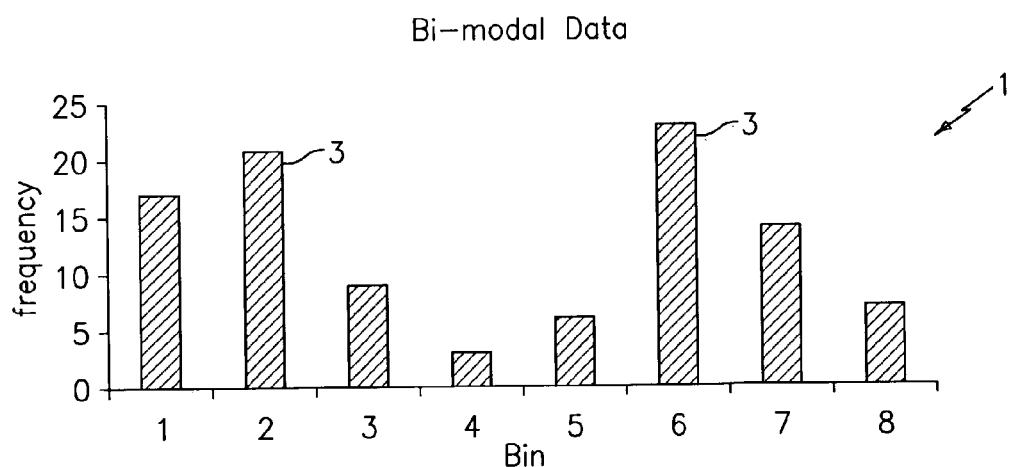
FIG. 2—A histogram of bimodal data.
Figure 3:
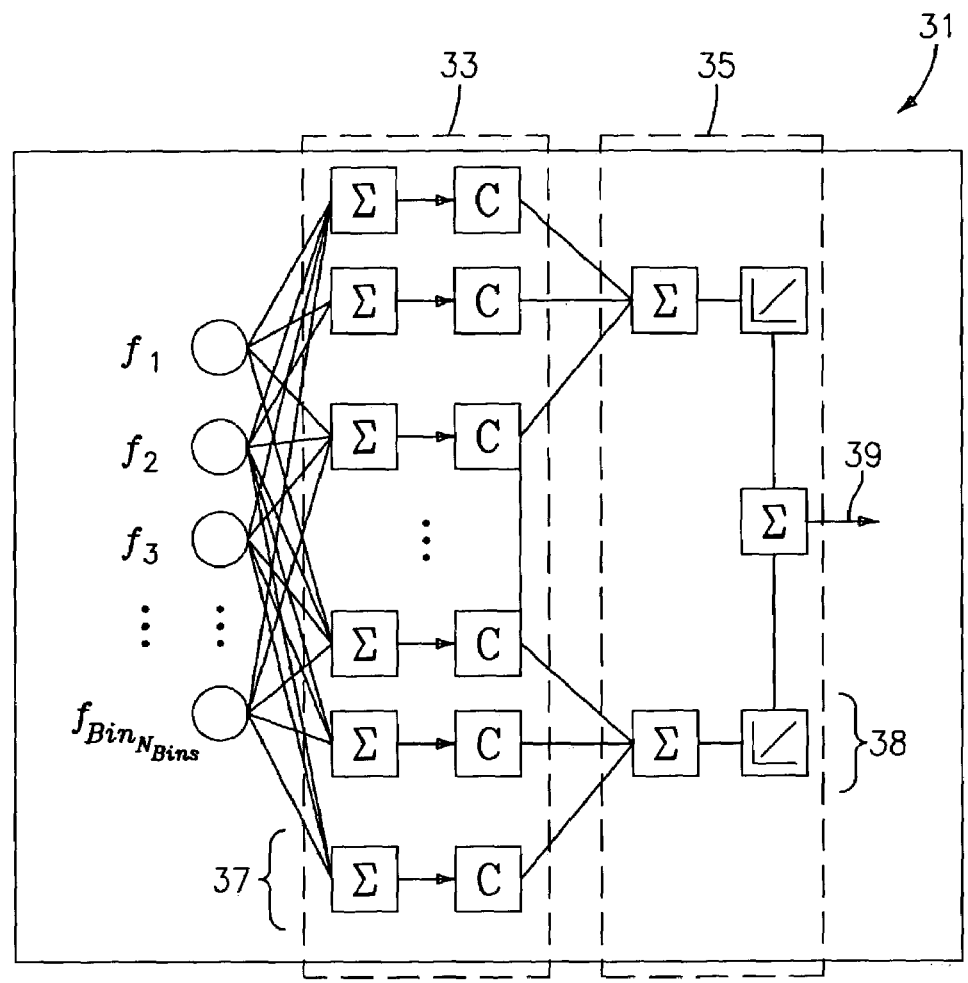
FIG. 3—A diagram of a Learned Vector Quantization (LVQ) network of the present invention.

It is a central feature of the present invention to train and utilize a neural network to automatically distinguish between a uni-modal and a bi-modal histogram. Although many types of neural networks are known which are suitable for implementing the methodology of the present invention, a preferred neural network is an Artificial Neural Network (ANN). A preferred ANN is a Learned Vector Quantization (LVQ) Network as illustrated in FIG. 3.

LVQ network 31 includes a competitive learning layer 33 followed by a linear layer 35. The competitive learning layer 33 is an un-supervised learning network that automatically learns to classify input data into groups (or classes). The number of classes is equal to the number of competitive layer neurons 37 chosen to be in the competitive learning layer 33. The larger the number of competitive layer neurons 37, the finer the decomposition.

In a preferred embodiment, the training of the LVQ network 31 is accomplished by using the Kohonen methodology. Since this form of training is un-supervised (i.e. the LVQ network 31 discovers its classes/groupings) a linear layer 35 is added to form the output 39 in order to allow a user to designate the appropriate category. This combined approach forms the basis of the LVQ network 31 of the present invention.

In the exemplary application of the method of the present invention discussed more fully below, there are two (ultimate) categories, i.e. uni-modal or bi-modal. Thus there are two linear network neurons 38 in the linear layer 35. In practice, the number of linear network neurons 38 varies according to the number of categories into which the input data is to be categorized. The number of competitive layer neurons 37 may be selected and modified as the result of feedback obtained when training the LVQ network 31 with different sample datasets resembling those expected to be encountered in operation. It is preferable to select the number of competitive layer neurons 37 to equal an integer multiple of the number of linear network neurons 38. Because the present example is illustrated with respect to two linear network neurons 38, it is preferable to choose an even number of neurons so that each category is matched to half the number of competitive layer neurons.

As noted above, it is preferable to select the number of competitive layer neurons 37 to equal an integer multiple of the number of linear network neurons 38. One preferred method of selecting the integer multiple is to select the number of bins into which the data is to be sorted. A preferred method of determining the number of bins into which the input data is to be sorted is Sturgis' formula. Sturgis' formula determines the number of bins in the histogram as follows:

$$N_{Bins} = \text{greatest\_integer}[1+3.3 \log_{10}(N)]$$

where N=sample size of the input data set. For small samples, (20 to 100), this yields 6 to 8 bins. In the present example the number of competitive layer neurons is determined to be $$N_{neurons} = 2N_{Bins}$$

Thus, we would need no more than 16 competitive layer neurons 37 to handle samples containing between 20 and 100 data points, i.e. 12, 14, and 16 neurons respectively.

Figure 4:
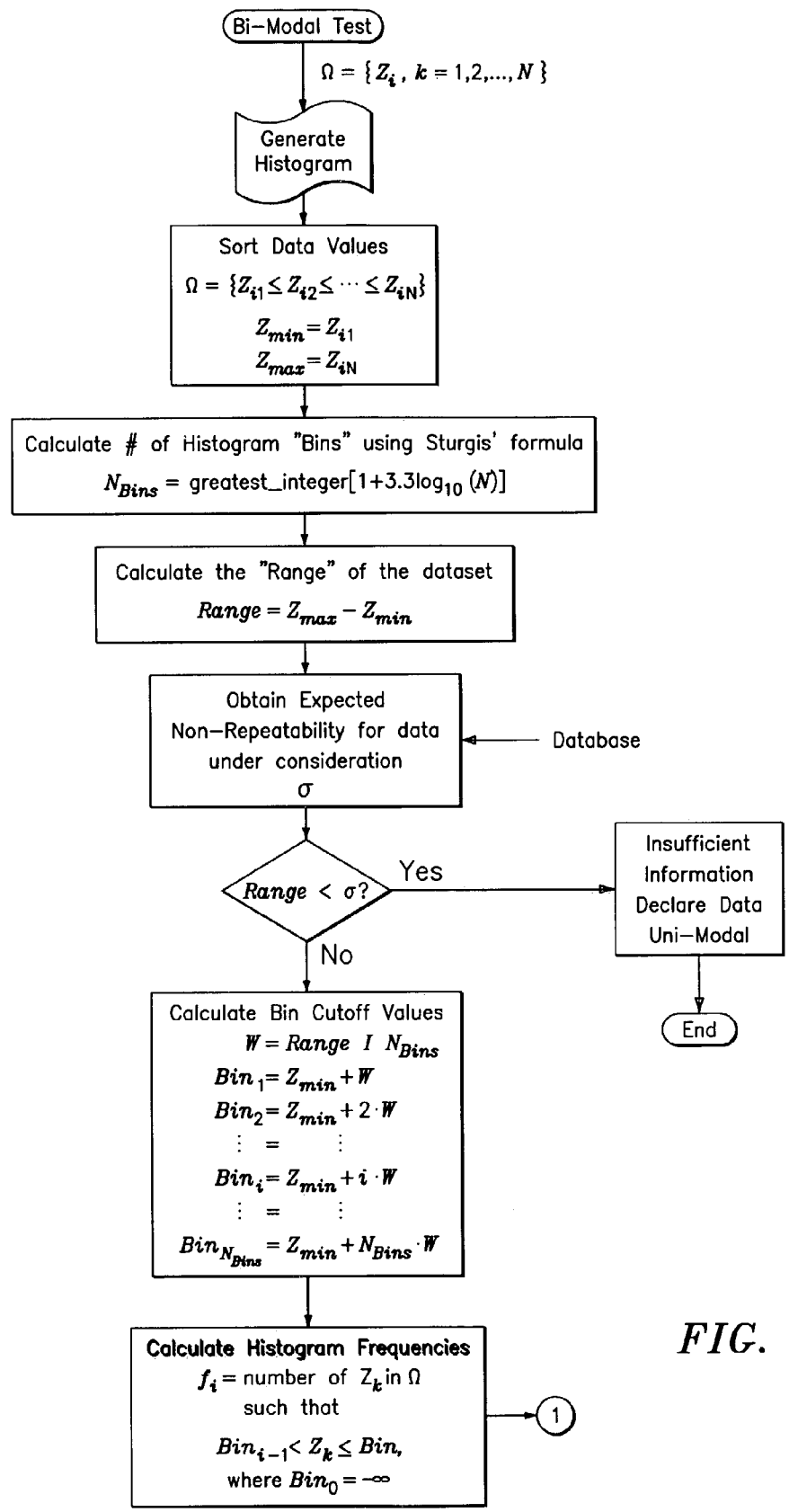
FIG. 4—A logic diagram of the pre-bimodal distributed determination process steps of the present invention.

With reference to FIG. 4, there is illustrated the steps performed to determine the Bi-Modality of a data set. To accomplish this, there is generated a histogram from of all input data values $Z_k$. This is accomplished as follows. The data values are sorted from lowest to highest. Next, there is determined the number of bins, $N_{Bins}$, into which the input data values are to be sorted using Sturgis' formula. Next, there is calculated the range of the data set (Max data value−Min data value) which is compared it to the expected non-repeatability ($\sigma$) for the data. Then, a check is performed to see if range >$\sigma$. If it is not, the test is be aborted and the input data is declared to be uni-modal. This guards against an input data sample that exhibits very minimal (or perhaps no) scatter, since such a data set does not yield a meaningful histogram.

Figure 5:
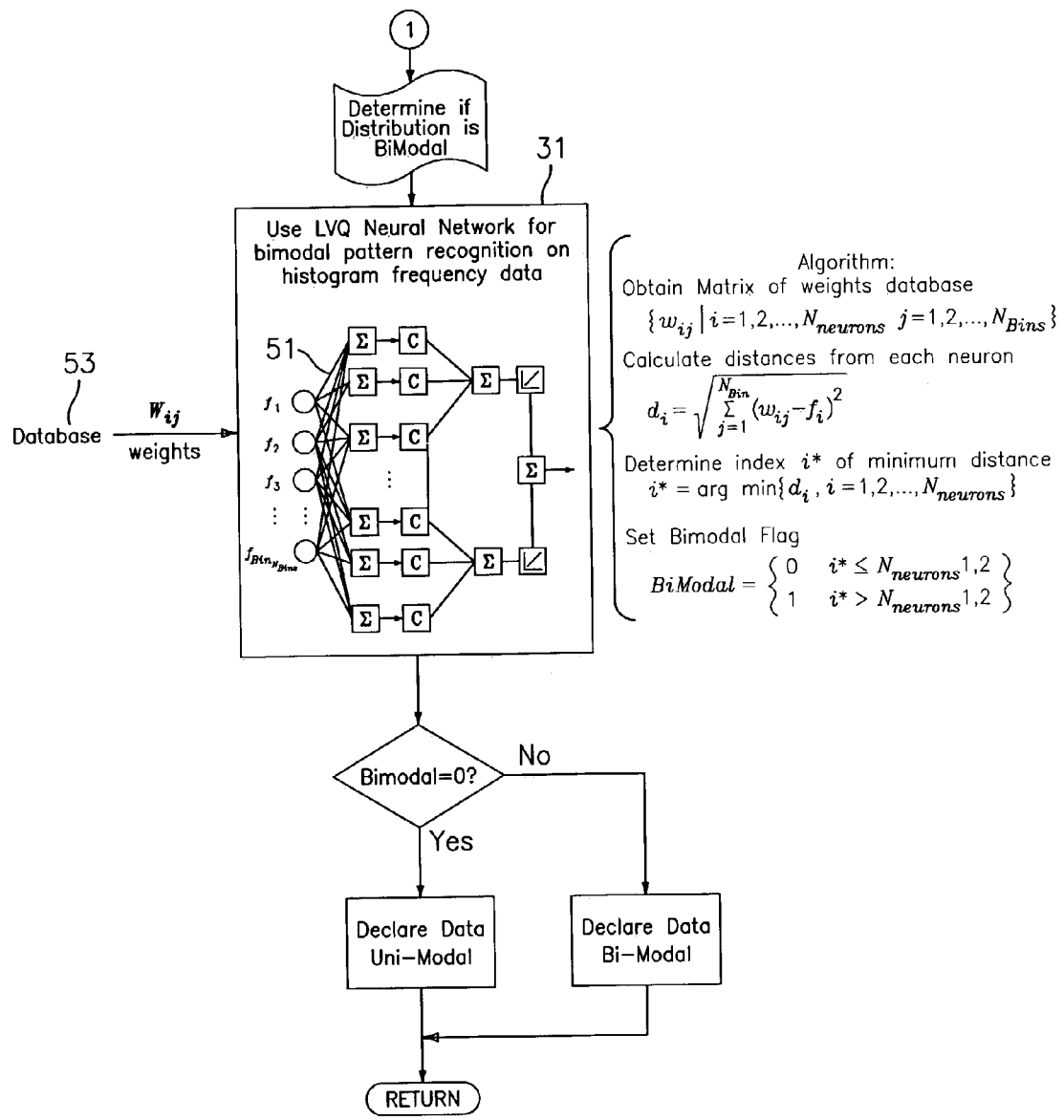
FIG. 5—A logic diagram of the bimodal distribution determination of the present invention.

If the range is >$\sigma$, the bin cutoff values are computed along with the histogram frequencies $\{f_1, f_2, \ldots f_{N_{Bins}}\}$ and the histogram frequencies are passed to LVQ network 31 to perform bi-modal pattern recognition. With reference to FIG. 5, there is illustrated a logic diagram of the steps performed to determine the bi-modality of the distribution.

First, there is selected a previously trained LVQ network 31 with preferably $N_{neurons} = 2N_{Bins}$ and having weights 51 precomputed weights $\{w_{ij} | i=1,2, \ldots, N_{neurons}, j=1,2, \ldots, N_{Bins}\}$ stored in a database 53. The weights are retrieved and passed to LVQ network 31 along with the histogram frequencies so as to perform the network calculations according to the following algorithm:

Calculate distances from each neuron $$d_i = \sqrt{\sum_{j=1}^{N_{Bins}} (w_{ij} - f_j)^2}$$

Determine index i* of minimum distance $$i* = \arg \min_i \{d_i, i=1, 2, \ldots, N_{neurons}\}$$

Set Bimodal Flag $$BiModal = \begin{cases} 0 & i* \leq N_{neurons}/2 \\ 1 & i* > N_{neurons}/2 \end{cases}$$

The trained LVQ network 31 partitions the training data into several sub-clusters across the total number of neurons $N_{neurons}$ and these are split into several target categories (in the present example 2, bi-modal and not bi-modal). Hence, half of the competitive layer neurons 37 are aligned to the one category and half to the other. Ordering the neurons in such a way as to have the $1^{st}$ half representing the not bi-modal and $2^{nd}$ half representing the bi-modal, allows for the simple test given above for specifying the bimodal flag.

As a result, the data set is declared bi-modal if bimodal=1.

What is claimed is:

1. A method for identifying bi-modal data comprising the steps of:

receiving a plurality of data inputs of a physical system;

inputting said plurality of data inputs of said physical system into a computer;

constructing a histogram from said plurality of data inputs;

computing a range of said plurality of data inputs;

comparing said range of said plurality of data inputs to an expected non-repeatability of said plurality of data inputs;

calculating a plurality of histogram frequencies if said range is not less than said expected non-repeatability;

inputting said plurality of histogram frequencies and a plurality of precomputed weights into a learned vector quantization (LVQ) network;

outputting from said learned vector quantization a signal representing a bimodal flag indicative of the bimodality of said plurality of data inputs; and determining a state of said physical system in response to said signal representing said bimodal flag.

2. The method of claim 1, wherein said constructing said histogram comprises the additional step of:

sorting said plurality of data inputs from lowest to highest;

calculating a number of bins;

calculating a plurality of cutoff values corresponding to a plurality of bins equal in number to said number of bins; and placing each of said plurality of data inputs into one of said plurality of bins.

3. The method of claim 1, wherein said inputting said plurality of histogram frequencies and a plurality of precomputed weights into a learned vector quantization (LVQ) network comprises the additional steps of:

constructing said learned vector quantization network comprising a plurality of competitive layer neurons and a plurality of linear layer neurons wherein a number of said plurality of competitive layer neurons is selected to equal the product of said number of bins and a number of said plurality of linear layer neurons; and receiving a plurality of precomputed weights from a database.

4. A learned vector quantization network for identifying bimodal data comprising:

means for receiving a plurality of histogram frequencies calculated using a plurality of data inputs of a physical system;

means for receiving a plurality of precomputed weights;
a competitive learning layer comprised of a plurality of competitive learning layer neurons each receiving the product of at least one of said plurality of precomputed weights and one of said plurality of histogram frequencies; and a linear layer comprised of a plurality of linear layer neurons for receiving a competitive learning layer output and outputting a bimodal flag;
wherein said bimodal flag indicates the need to determine a state of said physical system.

* * * * *

UNITED STATES PATENT AND TRADEMARK OFFICE
CERTIFICATE OF CORRECTION

| | |
|---|---|
| PATENT NO. | : 7,136,809 B2 |
| APPLICATION NO. | : 10/285961 |
| DATED | : November 14, 2006 |
| INVENTOR(S) | : Allan J. Volponi |

Page 1 of 1

It is certified that error appears in the above-identified patent and that said Letters Patent is hereby corrected as shown below:

In column 4, claim 3 line 52, "leamed" should read --learned--.

Signed and Sealed this

Eighth Day of May, 2007

JON W. DUDAS
*Director of the United States Patent and Trademark Office*